_United States Patent Office_ 3,120,715
Patented Feb. 11, 1964

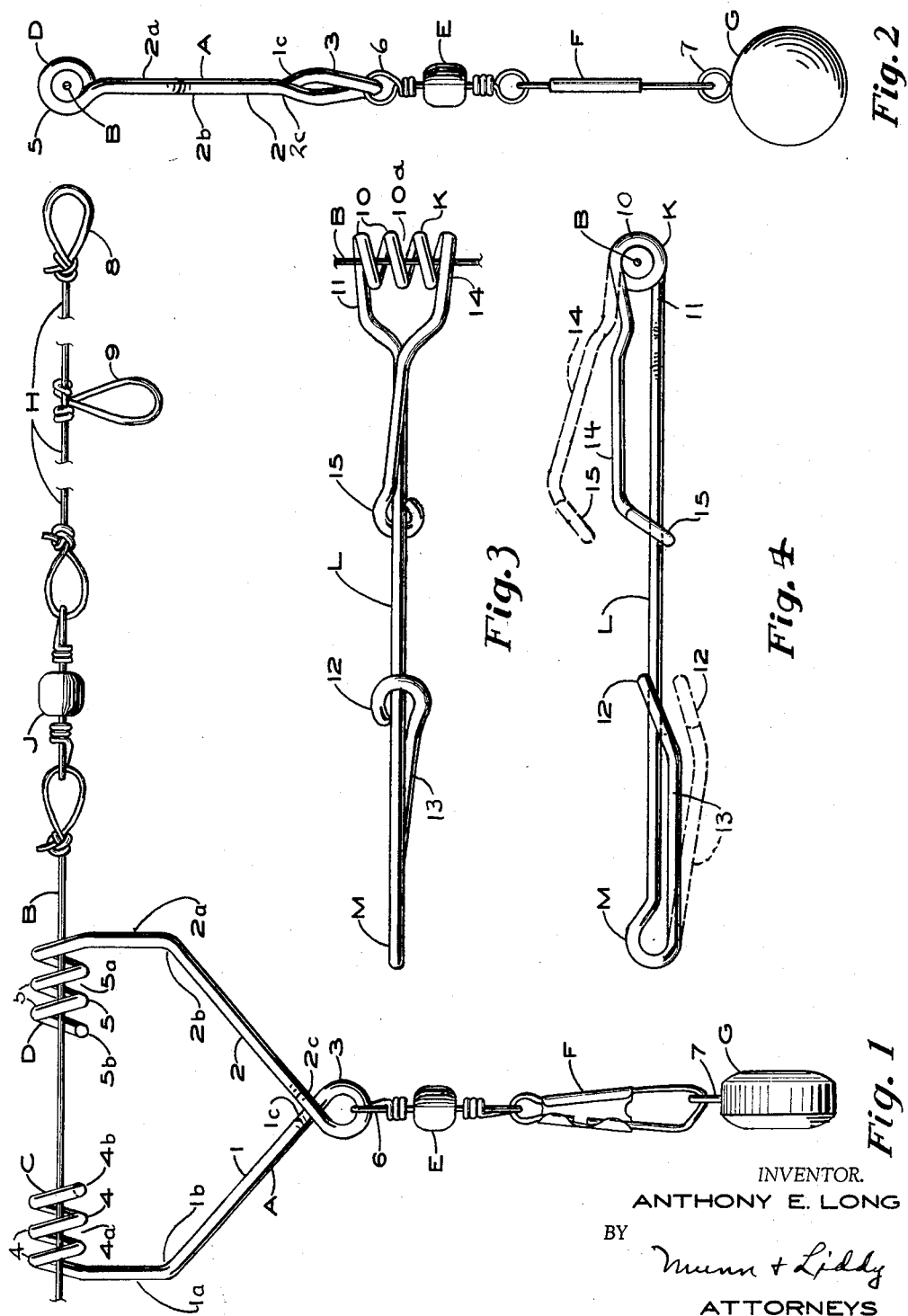

3,120,715
FISH LINE SINKER HOLDER
Anthony E. Long, 1612 67th Ave., Oakland 21, Calif.
Filed Mar. 23, 1962, Ser. No. 182,727
1 Claim. (Cl. 43—43.1)

The present invention relates to improvements in a fish line sinker holder and it consists in the combinations, constructions and operations hereinafter described and claimed.

An object of my invention is to provide a fish line sinker holder which can be very quickly and easily attached to a fish line or leader or detached therefrom without the necessity of threading the fish line or leader through any openings in the sinker or sinker holder and without the necessity of cutting the line or leader and then tying the cut ends together.

When a fisherman fishes with bait or lures from a bank or boat or does surf fishing or when he trolls from a slow moving boat, he must have an assortment of sinkers, rigs and lures for each type of fishing. When bait fishing from a bank, from a boat or from the surf, it is common practice for the fisherman to use a three foot leader with a loop at the top end and a barrel swivel is attached to this loop and to the fishing line. A loop is provided at the other end of the leader and a snap swivel is connected to this loop and in turn has a sinker of the desired size secured thereto. The leader has two or more loops along its length to which fish hooks are attached. This method of fishing is known as bank or bottom fishing and the fishing equipment just mentioned is referred to as a stationary rig. The sinker at the lower end of the leader keeps the bait anchored in one location.

When fishing into the surf or from a boat in water currents or tidal waters, it is common practice for the fisherman to use a rig that keeps the sinker stationary, but permits the fishing line to pass freely through the openings or tubes in the sinker or sinker holders. This permits the fish line that has the leader with its hooks and bait attached thereto to have complete freedom of sliding movement with respect to the sinker as the current or tide moves the leader with hooks and bait a distance from the sinker desired and controlled by the fisherman. The holder can also be used on the free line rig directly on the leader. This method of fishing is commonly known as free line fishing or fish finder method. The fisherman must pass the line through the openings in the tube of the sinker or the tube of a sinker holder or a large ring eyelet of a sinker holder before attaching the line to the leader.

When fishing from a boat at slow speed it is common practice for the fisherman to use a trolling sinker or a trolling leader rig with bait or lures attached and these trolling rigs are towed from the stern of the boat. The different depths of trolling are controlled by the type and size of the sinker used. Until the fisherman finds the proper depth to fish he must change the sizes of the sinkers and to do this he must first disconnect the line from the leader before he can make the change. This requires time and labor and frequently the line must be cut in order to effect the change.

My fish line sinker holder can be quickly attached to or detached from a fish line or leader and the fisherman therefore can change his rig or type of sinker quickly to permit him to do any of the different types of fishing above mentioned.

A further object of my invention is to provide a device of the type described in which the fish line sinker holder is made from one continuous length of non-corrosible wire which is circular in cross section. The holder has two inwardly extending spiral coils that have their inner ends spaced from each other. The loops of each spiral coil are spaced from adjacent loops in the same coil to provide a spiral space between adjacent coils that will permit a fish line or leader to be moved along this spiral or helical space in a manner hereinafter described for securing the line or leader to the coil or removing it therefrom. No cutting of the line or leader is necessary to effect its attachment to the coil or its removal therefrom. The inwardly extending coils will prevent obstructions or other fishing tackle from becoming entangled with the coils. The spirals of both coils are wound in the same direction to prevent the holder from becoming accidentally detached from the fish line or leader should the holder be rotated about the line as an axis in either direction. The inner ends of the coils are spaced apart so that a fisherman can place his thumb and forefinger in the space thus provided to grasp the fish line or leader portion that extends between the coil ends. The wire forming the holder is formed into an eyelet for receiving the wire loop of the sinker or any other fishing tackle such as a barrel or snap swivel. The portions of the wire adjacent to the eyelet are offset so as to retain the member carried by the eyelet and prevent its accidental removal.

A modified form of the invention discloses a single coil instead of two inwardly extending coils. The single coil fish line sinker holder can be used by fisherman who find it difficult to pass their fingers through the space lying between the inner ends of the two coils. The single coil holder has the loops of its coil spaced from each other to permit the fish line or leader to be attached to the coil or detached therefrom without the necessity of cutting the line or leader. The ends of the single coil are protected by extensions that form a part of the complete holder and these extensions prevent extraneous fishing tackle or objects from becoming entangled in the coil.

Both forms of the device are extremely simple in construction and they are durable and efficient for the purpose intended.

Other objects and advantages will appear as the specification continues. The novel features of the invention will be set forth in the appended claim.

_Drawing_

For a better understanding of my invention, reference should be made to the accompanying drawing, forming part of this specification, in which:

FIGURE 1 is a front elevation of my fish line sinker holder and illustrates two inwardly extending coils;

FIGURE 2 is an end elevation of FIGURE 1; the device being shown on a slightly enlarged scale;

FIGURE 3 is a front elevation of the modified form of the fish line sinker holder where only one coil is used; and FIGURE 4 is an end elevation of FIGURE 3.

While I have shown only the preferred forms of my invention, it should be understood that various changes, or modifications, may be made within the scope of the annexed claims without departing from the spirit thereof.

_Detailed Description_

The form of the device shown in FIGURES 1 and 2 is for a fish line sinker holder and the device is indicated generally at A. The device is made from a single length of non-corrosible wire that is circular in cross section. The wire is formed into a V-shaped frame with arms 1 and 2 diverging one from the other and forming the sides of the frame. At the vertex of the V, an eyelet 3 is formed. The inclined arms 1 and 2 have extensions 1a and 2a that are arranged parallel with each other. The extension 1a forms an angle at the point 1b with the arm 1 while the extension 2a forms an angle 2b with the arm 2.

At the top of the extension 1a the wire is formed into an inwardly extending coil C in which the loops 4 of the coil are spaced from each other a distance sufficient for a fish line B to be threaded through the helical space 4a formed between the spaced loops. In like manner at the top of the extension 2a, I form the wire into an inwardly extending coil D in which the loops 5 of the coil are spaced from each other a distance sufficient for the fish line B to be threaded through the helical space 5a. The inwardly extending coil C may have any desired number of loops 4 formed therein and I have shown three such loops. Also the inwardly extending coil D may have any desired number of loops 5 formed therein and again I have shown three such loops.

The coil D is shown in end view in FIGURE 2 and it will be noted that the wire forming the loop is wound in a clockwise direction. The wire of the coil C is also wound in a clockwise direction when looking at the inner end of the coil. The coil D has its inner end 5b placed at the bottom of the coil and this inner end will lie in a plane that extends across the arms 1 and 2 and their parallel extensions 1a and 2a. The end 4b of the coil C also terminates at the bottom of the coil and this end will lie in the same plane that extends through the end 5b of the coil D and also includes the arms 1 and 2 and their extensions 1a and 2a. A clearer picture of the shape of the inwardly extending coils C and D might be gathered if one would consider that a continuous coil lying between the extensions 1a and 2a were made and then this coil was cut so as to have its central portion removed. The cuts to remove the central portion would be at the points 4b and 5b so that the ends produced by the cuts would lie in the same plane that includes the arms 1 and 2 and their extensions 1a and 2a.

The reason for the two coils C and D extending inwardly rather than outwardly is that the extensions 1a and 2a will be at the outer ends of the coils C and D and will prevent objects or other fishing tackle from becoming entangled in the coils. Other fish lines or fishing tackle even though contacted by the sides 1 and 2 of the frame A would not become entangled, with the coils C and D because the sides would move the contacting member away from the coils C and D as the frame moved by the member. The extensions 1a and 2a would also prevent the contacting member such as another fish line or fish lure from becoming entangled with the two coils C and D because the coils extend inwardly from the extensions. The space between the adjacent ends 4b and 5b of the two coils C and D is great enough to permit the fisherman to place his thumb and forefinger between the ends to grasp the portion of the fish line B lying between the coils. I will described hereinafter how the line B can be attached to or detached from the coils. The wire in both coils C and D is wound in the same direction so that the fish line B will not become accidentally detached from the holder should the frame A swing about the fish line as an axis in a clockwise or counterclockwise direction.

It is important to note that the eyelet 3 is formed at the juncture of the two diverging arms 1 and 2 and the arm 1 is offset at 1c and the arm 2 is offset at the point 2c in order to cause the plane of the eyelet 3 to lie in the same plane that includes the arms 1 and 2 and their extensions 1a and 2a. It is possible to attach any fishing tackle to the eyelet 3 and the offset portions 1c and 2c will prevent the tackle from moving onto the arms 1 and 2. In FIGURES 1 and 2, I show a barrel swivel E and the eyelet 6 of the swivel can be threaded onto the wire forming the coil C when starting at the end 4b. The eyelet of the barrel swivel E can be moved along the loops 4 of the coil C until the outer end of the coil is reached and then the eyelet can be moved along the extensions 1a and then down along the arm 1 and finally forced between the offset portions 1c and 2c and into the eyelet 3. The offset portions 1c and 2c prevent the eyelet of the barrel swivel from accidentally being moved free from the eyelet 3 and moving along the arms 1 or the arm 2. The swivel E is a standard piece of fishing tackle and this forms no part of my present invention. Any other fishing tackle could be attached to the eyelet 3.

The barrel swivel E can support a fastener indicated generally at F and this fastener is also of standard construction and forms no part of my invention. The fastener is not only removably secured to the barrel swivel E, but it in turn is also removably secured to a sinker indicated generally at G. It is possible to thread the eye 7 of the sinker along the coiled wire forming the coil C and having the sinker G directly attached to the frame A by having the eye 7 moved along the arm 1 and into the eyelet 3 of the frame. When this is done, the barrel swivel E will, of course, first be removed from the eyelet 3.

It is best now to describe how the fish line B can be secured to the inwardly extending coils C and D of the frame A or removed therefrom without the necessity of cutting the fish line in order to remove the frame therefrom or of tying the cut ends of the line together when it is desired to again secure the frame to the line. In securing the line to the coil C, the operator grasps the fish line B and places it on the front of the extension 1a and temporarily holds the line against the extension 1a with the thumb of his left hand holding the line down upon the extension and the forefinger of his same hand bearing against the rear of the extension. The operator then takes his right hand and grasps the portion of the fish line B that extends to the right of the line portion that is held against the extension 1a. The operator takes the right hand extending portion of the fish line and moves it in a circular motion so that the line will follow the helical space 4a provided between the loops 4 and starting at the end of the coil C which is nearest the extension 1a. As the fish line is swung so as to feed it into the helical space 4a, it will eventually reach the inner end of the helical space and then the line projecting beyond the end can be pulled taut and the line will be centered along the axis of the coil C.

The operator now secures the fish line to the other coil D. To accomplish this he first provides sufficient slack in the fish line between the inner end of the coil C and the coil D and then he places the slack portion of the fish line extending to the right of the coil C in FIGURE 1 against the underside of the extension 2a and holds the line to the extension by the thumb and forefinger of his right hand. He then takes the slack portion of the fish line extending to the left of where he grips the line with his right hand and swings this slack portion in a circular motion so as to feed the line into the helical space 5a formed between the loops 5 of the coil D starting from the end of the coil D disposed nearest to the extension 2a. The circular motion of the fish line will feed the line into the helical space 5a until the inner end 5b of the coil D is reached. The operator can then pull on the fish line B that projects from the right hand end of the coil D in FIGURE 1 and from the left hand end of the coil D in FIGURE 1 and from the left hand end of the coil C and this will center the fish line in the coil D as well as in the coil C. In this simple way the fish line B has been attached to the coils C and D of the frame without the necessity of cutting the line so as to feed it through the centers of the two coils.

It will be observed that the helical spaces 4a at the coil C, and the helical spaces 5a at D, advance inwardly, and it is in this inward circular motion that the operator must feed the line or leader in the helical spaces 4a and 5a, to attach the line or leader to th holder. And starting at 4b at the coil C, and 5b at the end of the coil D, by feeding the line or leader in the helical spaces 4a of coil C and 5a of coil D, in an outward circular motion to remove the line from the holder.

When removing the fish line B from the frame A, the reverse steps of those just given are followed. First a slack is formed in the portion of the line B lying between the inner ends 4b and 5b of the coils C and D and then the operator grasps the slack portion in his right hand and holds the frame A in his left hand. He then swings the slack line portion in a circular motion so as to feed it into the helical space 4a starting at the inner end 4b of the coil C. The rotative movement of the line portion will cause it to follow the helical space 4a until the outer end of the coil C is reached which is adjacent to the extension 1a and then the line will be freed from the coil C.

The operator in freeing the line from the coil D grasps the line extending to the left of the end 5b of the coil D with his left hand and will hold the frame A with his right hand. A circular motion of the line will cause it to follow the helical space 5a starting from the end 5b of the coil D and will gradually free the line from the coil until the outer end of the coil is reached which is adjacent to the extension 2a. The line will thus be freed from the coil D. In this simple manner the fish line B can be freed from both of the coils C and D without the necessity of cutting the line.

In FIGURE 1, I show the fish line B connected to a leader H by a barrel swivel indicated generally at J. It is possible to attach the frame A directly to the leader H rather than to the fish line B. When the frame A is attached to the fish line B, as shown in FIGURE 1, then the fish line is free to slide through the two coils C and D and this is called free line fishing. The sinker G will rest on the bed of the stream or lake and any amount of line B can be freely fed through the two coils C and D.

In FIGURES 3 and 4 I show a modified form of the invention. In this form a single coil K is shown and the loops 10 of the coil are spaced from each other to provide a helical space 10a. The left hand end of the coil K shown in FIGURE 3 has a wire shank L that extends downwardly from the coil and preferably projects at right angles to the axis of the coil and is spaced midway between the ends of the coil. In fact, the same wire that forms the coil K has an inclined extension 11 that connects with the upper end of the coil and also with the shank L. The same non-corrosive wire that forms the coil K, also forms the extension 11. The device is shown in a horizontal position in FIGURES 3 and 4.

FIGURE 4 shows the left end of the shank L as being formed into a metal loop M for receiving any fishing tackle such as the barrel swivel E, the fastener F or the sinker G. The metal loop M has a catch which is in the form of an open loop and this catch will engage with the shank L to keep the metal loop M closed when the catch engages with the shank L. When the side 13 of the metal loop M is pressed inwardly toward the shank L when looking at FIGURE 4, the catch 12 will be freed from the shank and then when the pressure is released on the side 13, the resiliency of the wire will cause the side to swing into the dot-dash line position also shown in FIGURE 4. The metal loop M is now open and can receive any fishing tackle, not shown. The side 13 can then be forced toward the shank L for feeding the open loop catch 12 around the shank and then when the side 13 is freed, the catch 12 will engage with the shank L and will hold the loop closed as shown in the full line position in FIGURE 4.

The right lower end of the loop K has an extension 14 and this extension is provided with a catch 15 which is in the form of an open loop. The extension 14 has a tendency to swing into the dot-dash line position shown in FIGURE 4 when the extension 14 is pressed toward the shank L to free the catch 15 from the shank. When this is done, the fish line B can be moved up into the first helical space 10a next to the inclined extension 11 between the shank L and the extension 14, and then the fish line may be grasped with the thumb and forefinger of the left hand of the operator so as to temporarily secure the fish line B to the shank L. Then the portion of the line extending to the right of the manually gripped portion can be swung through an arc for feeding the line into the helical space 10a provided between the loops 10 toward the extension 14, of the coil K. For each circular movement of the line along the helical space 10a it is necessary to have the line pass around the freed end 15 of the extension 14. When the end of the helical space is reached the line will be centered in the coil K. The catch 15 can now be secured to the shank L by forcing the extension 14 toward the shank.

The outer ends of the coil K are protected by the extensions 11 and 14 and therefore no obstruction can become entangled with the coil. The fish line B is free to slide through the coil K for what is termed free line fishing. A sinker, not shown in FIGURES 3 and 4, but of the type shown at G in FIGURES 1 and 2, can be secured to the metal loop M.

It is possible to have the modified form of the device attached to the leader H and anchored in place by the end loop 8 or the intermediate loop 9 shown in FIGURE 1. To accomplish this, the desired loop 8 or 9 is moved over the coil K and then the loop is moved to the left until it clears the extensions 11 and 14 and the catch 15. The loop will now be received on the shank L. It is possible to feed the loop 8 or 9 in from the left end of the shank L, the loop 8 or 9 being passed over the wire loop M. The loop 8 or 9 is now moved onto the side 11 and then the leader H extending to below the loop is held on the upper side of the extension by the left hand of the operator and the loop is fed through the helical space 10a in precisely the same manner as explained for feeding the line B into the helical space. The rest of the steps for securing the line to the coil K are followed in securing the leader H to the same coil. The loops 8 or 9 will prevent the coil K from sliding along the leader H.

Some fishermen desire the modified form of my invention since it consists of one closed coil K and the built in snap, the snap comprising the metal loop M and the side 13 with the catch 12. The intermediate loops 9 in the leader H, are commonly known as drop loops. The leader may be provided with as many drop loops 9 as desired by the fisherman.

In the form of the device shown in FIGURES 1 and 2, the inner ends 4b and 5b of the coils C and D, not only are positioned at the bottoms of the coils, but the ends face each other even though they are spaced apart. The fish line B or the leader H will not accidentally enter both helical spaces 4a and 5a at the same time to move along these helical spaces until the coils C and D are freed from the line or leader because the inner coil ends 4b and 5b face each other and extend in opposite directions. Therefore if the frame A should swing to accidentally feed the line B into the helical space 4a, this same rotation would prevent the line at the same time feeding into the helical space 5a. The device cannot become accidentally freed from the line B. The offsets 1c and 2c on the sides 1 and 2 help to stiffen the frame A, as well as aiding in keeping the two coils C and D in axial alignment with each other. The spaced apart coils prevent the frame A from twisting on the line or leader.

The spacing of the loops from each other in the coils C and D of the frame A or in the loops in the coil K, makes the coils self-cleaning. The spaces between adjacent coils permits any foreign matter to escape from the coils. Both forms of the invention when attached to a line or leader will not interfere with the casting of the line. The devices will keep the line above the sinker. If a snap swivel breaks, it may be removed from the device and a new one substituted. The device need not be thrown away.

I claim:

A fish line sinker holder formed from a single wire and comprising:

(a) a single helical coil having adjacent loops spaced apart for permitting a fishing line or leader to be moved in one direction along the helical space provided between the loops for entering it into the coil or to be moved in the opposite direction for freeing it from the coil;
(b) the wire extending from one end of said coil and forming a shank that extends at right angles to the coil axis;
(c) the wire extending from the other end of said coil having a catch formed in its end that removably engages with said shank; and
(d) an extension of the shank having a loop formed therein for removably receiving a sinker;
(e) said loop having a catch that removably engages with an intermediate portion of said shank for closing the loop.

References Cited in the file of this patent
UNITED STATES PATENTS

| | | |
|---|---|---|
| 2,111,958 | Bardon | Mar. 22, 1938 |
| 2,217,972 | Smith | Oct. 15, 1940 |
| 2,608,017 | Huikson | Aug. 26, 1952 |

FOREIGN PATENTS

| | | |
|---|---|---|
| 307,685 | Great Britain | Mar. 14, 1929 |